United States Patent Office 3,287,381
Patented Nov. 22, 1966

3,287,381
PROCESS FOR THE PREPARATION OF SULFONATED AROYL ACETARYLIDES
Arthur Henri De Cat, Mortsel-Antwerp, and Raphael Karel Van Poucke, Mechelen, Belgium, assignors to Gevaert Photo-Producten N.V., Mortsel-Antwerp, Belgium, a Belgian company
No Drawing. Filed Oct. 24, 1963, Ser. No. 318,487
Claims priority, application Great Britain, Apr. 5, 1955, 9,900/55
9 Claims. (Cl. 260—401)

This application is a continuation-in-part of co-pending application Serial No. 40,145 filed July 1, 1960, now abandoned, which in turn is a continuation-in-part of application Serial No. 575,718 filed April 3, 1956, now U. S. Patent No. 2,950,314 issued August 23, 1960.

This invention relates to new compounds containing a sulfonic acid group, and to a method for preparing such compounds.

The use in color photography of color forming compounds which react with the oxidation or development product of aromatic amino developing agents to form colored images upon photographic development is well known.

When the color couplers are to be incorporated in photographic emulsions, it is customary to make them of rather more complex structure in order to reduce the extent to which they will wander during the coating or processing of the emulsions. However, when they are used in the emulsion, the couplers must be soluble in the medium in which they are incorporated. Accordingly, when they are directly incorporated in gelatin or other hydrophilic medium, the couplers must have groups enabling them to be rendered water-soluble, such as sulfonic acid groups.

The color couplers conventionally used in color photography for the formation of the yellow azomethine dye image are of the acylacetarylide series.

According to our copending application Serial No. 575,-718, now Patent No. 2,950,314, dated August 23, 1960, sulfonated aroylacetarylides of the following structure R—CO—CH$_2$—CO—NH—R'—SO$_3$Me wherein R represents an aryl radical selected from the group consisting of alkoxyphenyl, alkoxynaphthyl, dialkoxyphenyl, dichloroalkoxyphenyl, isooctylphenoxyethoxyphenyl, nitrophenyl and acylaminophenyl, R' represents a monocyclic arylene radical of the benzene series, selected from the group consisting of phenylene, chlorophenylene, dialkylaminophenylene, alkylphenylene, alkoxyphenylene, dialkoxyphenylene and acylaminophenylene and Me represents an alkali metal atom are prepared by condensing an aroyl acetic ester of the following formula:

R—CO—CH$_2$—CO—OR'' wherein R'' represents a lower alkyl group, with a compound of the formula H$_2$N—R'—SO$_2$F, and hydrolyzing the resulting compound in the presence of an alkali metal hydroxide solution.

According to the present invention a sulfonated aroyl acetarylide of the following structure X—NH—Ar—CO—CH$_2$—CO—NH—Y—SO$_3$Me wherein X is an acyl radical;
Ar is an arylene radical preferably a monocyclic arylene radical of the benzene series;
Y is an arylene radical preferably a monocyclic arylene radical of the benzene series, e.g., a phenylene, alkylphenylene, or an alkoxyphenylene radical; and
Me is hydrogen or an alkali metal atom, is prepared by condensing an aroyl acetic ester of the following formula:

O$_2$N—Ar—CO—CH$_2$—COOR'' wherein R'' represents an alkyl group preferably a lower alkyl group with a compound of the formula

H$_2$N—Y—SO$_2$F reducing the nitro group in the compound thus obtained to an amino group, condensing the resulting compound with a member selected from the group consisting of a carboxylic acid chloride, a sulfonic acid chloride or a carboxylic acid anhydride and hydrolyzing the resulting compound in the presence of an alkali metal hydroxide solution.

The acyl radical, X preferably is a member of the group consisting of alkanoyl, alkyl sulfonyl, alkenoyl, and alkenyl sulfonyl of from 10–25 carbon atoms, at least 5 of these carbon atoms being arranged in a linear chain. More specifically, preferably the linear chain comprises 16 or 18 carbon atoms, e.g., palmitoyl, stearoyl, hexadecylsulfonyl, hexadecenylsulfonyl, octadecylsulfonyl, octadecenylsulfonyl, α-hexadecylsuccinyl, α-hexadecenylsuccinyl, α-octadecylsuccinyl, α-octadecenylsuccinyl.

The condensation products prepared according to the present invention separate in large yield as white crystalline compounds. These fluorosulfonyl derivatives can be purified very easily by recrystallization and are exceptionally stable to storing. Moreover, according to the present invention, the sufonyl derivative can be hydrolyzed either during or before the preparation of the emulsion and the color coupler thus formed can be incorporated into the emulsion.

In the first case, the condensation products obtained are saponified very quickly to the corresponding sulfonate by dissolution of 1 mol of sulfonyl fluoride derivative in 3 mols of sodium hydroxide solution. This clear solution is, after optional adaption of the degree of acidification, added as a 5 or 10% solution to the emulsion. In the second case, the sulfonyl fluoride derivative can be saponified according to the process described hereinafter in the examples in acetone medium with aqueous sodium hydroxide or potassium hydroxide solution, whereby the color coupler can be separated from the saponifying medium in pure state and in practically quantitative yield as a white crystalline compound. It is sufficient to dissolve the color coupler thus obtained in water, before its use, in which form it can be added to the emulsion after suitable adjustment of the degree of acidification.

The following examples illustrate the present invention without limiting, however, the scope thereof.

EXAMPLE 1

*Preparation of 3-[α(3'-myristoylaminobenzoyl)acetyl]-amino benzene sulfonic acid sodium salt*

(a) *3-fluorosulfonyl-α-(3'-nitrobenzoyl)-acetanilide.*— 22.3 g. of m-nitrobenzoyl acetic acid methyl ester and 17.5 g. of m-aminobenzene sulfonyl fluoride (mentioned in our formed U.S. patent application Serial No. 575,718, filed April 3, 1956, now Patent No. 2,950,314) are heated in 100 cm.³ of anhydrous xylene to boiling temperature. Within a period of 3 hours, 50 cm.³ of a mixture of methanol and xylene are distilled off whereafter the reaction mixture is cooled to room temperature. The precipitated formed is filtered off and recrystallized from dioxane. After drying at 80–100° C., 31.1 g. of a pale-yellow product melting at 176° C. are obtained.

(b) *3-fluorosulfonyl-α-(3'-aminobenzoyl)-acetanilide.*— 36.6 g. of 3-fluorosulfonyl-α-(3'-nitrobenzyl)-acetanilide dissolved in 300 cm.³ of dioxane are hydrogenated in the presence of 3 g. of Raney nickel at a hydrogen pressure of 20 atm. and a temperature of 75° C. After absorption of the theoretical amount of hydrogen, the Raney nickel is filtered off and the filtrate is slowly poured into 1½ l. of an icewater mixture. The formed fine-granular precipitate is dried for 2 hrs. at 70–80° C. Yields: 25 g. Melting point: 150° C. By recrystallization from dichloroethane, the melting point is raised to 152° C.

(c) *3-fluorosulfonyl - α - (3'-myristoylaminobenzoyl)-acetanilide.*—16.8 g. of 3-fluorosulfonyl-α-(3'-aminobenzoyl) acetanilide, prepared as in (b) above, and 4 g. of pyridine are dissolved in 80 cm.³ of anhydrous dioxane. During a period of 10 minutes 12.35 g. of myristoyl chloride are added dropwise; whilst stirring, to the above solution, the temperature rising up to 35-40° C. Stirring is continued for 1 hour at this temperature and for 2 hours at 70° C. After pouring the reaction mixture into 2 N aqueous hydrochloric acid, a fine-granular precipitate is obtained which is recrystallized from acetonitrile. Yields: 21 g. of a white product, melting at 99° C.

(d) *3[α - (3' - myristoylaminobenzoyl) - acetyl]-amino-benzene sulfonic acid sodium salt.*—10.92 g. of 3-fluorosulfonyl-α-(3'-myristoylaminobenzoyl) - acetanilide are refluxed with 80 cm.³ of acetone; 12 cm.³ of sodium hydroxide 5 N are added to the reaction mixture which is further refluxed for 45 minutes, whilst stirring. After acidifying with acetic acid and cooling to room temperature, the precipitate formed is filtered off and recrystallized from "Methyl Cellosolve" (registered trademark for ethyleneglycol monomethyl ether). Yields: 10 g. of a white fine-granular product.

EXAMPLE 2

*Preparation of 4-[α-β'-palmitoylaminobenzoyl) - acetyl]-amino-benzene sulfonic acid sodium salt*

(a) *4-fluorosulfonyl-α-(3'-nitrobenzoyl)-acetanilide.*—This compound was prepared as described in Example 1(a). Starting from 17.5 g. of p-aminobenzenesulfofluoride (mentioned in our formed U.S. patent application Serial No. 575,718, filed April 3, 1956, now Patent No. 2,950,314) and 22.3 g. of m-nitrobenzoyl-acetic acid methyl ester, there was obtained, after recrystallization from Methyl Cellosolve 26 g. of a pale-yellow crystalline product melting at 238° C.

(b) *4-fluorosulfonyl-α-(3'aminobenzoyl) acetanilide.*—In a reduction carried out in the same manner as given in Example 1(b), 25.7 g. of a crystalline product melting at 192–193° C. are obtained starting from 36.6 of 4-fluorosulfonyl-α-(3'-nitrobenzoyl) acetanilide.

(c) *4 - fluorosulfonyl-α-(3'-palmitoylamino - benzoyl)-acetanilide.*—This compound was prepared in the same manner as described in Example 1(c). Starting from 16.8 g. of 3-fluorosulfonyl-α-(3'-aminobenzoyl)acetanilide and 12.35 g. of palmitoylchloride and after recrystallization from acetonitrile there was obtained 27 g. of white crystals melting at 90° C.

(d) *4[α-(3'-palmitoylaminobenzoyl) - acetyl] - amino-benzene sulfonic acid sodium salt.*—The saponification was carried out as mentioned in Example 1(d). Starting from 10.92 g. of sulfonylfluoride derivative, there was obtained after crystallization from acetic acid, 9.6 g. of a white product.

EXAMPLE 3

*Preparation of 2-methyl-3[α(3'-palmitoylaminobenzoyl)-acetyl]-amino-benzene sulfonic acid sodium salt*

(a) *2 - methyl-5-fluorosulfonyl-α-(3' - nitrobenzoyl)-acetanilide.*—This compound was prepared as described in Example 1(a). Starting from 18.9 g. of 3-amino-4-methylbenzene sulfonylfluoride (mentioned in our former patent application U.S. Serial No. 575,718, filed April 3, 1956, now Patent No. 2,950,314) and 22.3 g. of m-nitrobenzoylacetic acid methyl ester, there was obtained, after recrystallization from a mixture of dimethylformamide and methanol 27.5 g. of pale-yellow crystals melting at 200° C.

(b) *2 - methyl-5-fluorosulfonyl-α-(3' - aminobenzoyl)-acetanilide.*—The reduction of the above nitro-derivative was carried out as given in Example 1(b). Starting from 38 g. of 2-methyl - 5 - fluorosulfonyl-α-(3' - nitrobenzoyl)-acetanilide there was obtained after recrystallization from methanol 24.5 g. of a pale-yellow crystalline product melting at 160° C.

(c) *2 - methyl-5-fluorosulfonyl-α-(3' - palmitoylaminobenzoyl)-acetanilide.*—The acylation was carried out as in Example 1(c). 17.5 g. of 2-methyl-5-fluorosulfonyl-α-(3'-aminobenzoyl) acetanilide and 12.35 g. of palmitoylchloride yield after recrystallization from methanol, 20.5 g. of a white product melting at 110° C.

(d) *2-methyl-3[α(3'-palmitoylaminobenzoyl)-acetyl]-amino benzene sulfonic acid sodium salt.*—The saponification was carried out as described in Example 1(d). 11.76 g. of sulfonylfluoride derivative yield after recrystallization from methanol, 8 g. of a white crystalline powder.

EXAMPLE 4

*Preparation of 2[α-(3'-palmitoylaminobenzoyl)acetyl] amino-4-(3''-sulfophenyl)-thiazole sodium salt*

(a) *3 - fluorosulfonylacetophenone.*—This compound was prepared according to the procedure described for the synthesis of p-nitroacetophenone (L. Young, H. Troutman J.A.C.S. 71 (1949) 2473). 222.5 g. of 3-fluorosulfonylbenzoylchloride (W. Steinkopf, J. Prakt. Chem. 2 117 (1927) 31) yield after crystallization from methanol, 142 g. of a white crystalline product melting at 92° C.

(b) *2 - amino - 4-(3'-fluorosulfonylphenyl)thiazole.*—51.6 g. of 3-fluorosulfonylacetophenone dissolved in 50 cm.³ of dioxane are treated with 16 g. of bromine at a temperature of 30–40° C. After complete addition of bromine, stirring is continued for another 45 minutes. The resulting orange-colored solution is added to a suspension of 15.2 g. of thiourea in 50 cm.³ of ethanol. After refluxing for 30 minutes, the mixture is cooled to room temperature. The hydrobromide of the aminothiazole derivative separated as a heavy precipitate and was filtered off. The free base was obtained by treating the hydrobromide with a solution of sodium bicarbonate in water. Pale-yellow crystals are obtained after recrystallization from methanol. The yield was 38 g. melting at 152° C.

(c) *2[α(3' - nitrobenzoyl)acetyl]amino - 4(3''- fluorosulfonylphenyl) thiazole.*—The same procedure was used as in the preparation of the product described in Example 1(a). The reaction of 25.8 g. of 2-amino-4-(3'-fluorosulfonyl)phenyl-thiazole and 22.3 g. of 3-nitrobenzoylacetic acid methyl ester yield after recrystallization from Methyl Cellosolve 36 g. of pale-yellow needles. Melting point: 204–205° C.

(d) *2 - [α(3' - aminobenzoyl)acetyl]amino - 4 - (3''-fluorosulfonylphenyl)thiazole.*—The reduction of the above nitro derivative is carried out as given in Example 1(b). 44.9 g. of 2[α(3'-nitrobenzoyl)acetyl]amino-4-(3''-fluorosulfonylphenyl)thiazole yield after recrystallization from acetonitrile, 29.4 g. of a white crystalline product melting at 203–204° C.

(e) *2[α - (3' - palmitoylaminobenzoyl)acetyl]amino-4-(3''-fluorosulfonylphenyl)thiazole.*—21 g. of 2[α-(3'-palmitoylaminobenzoyl)acetyl]amino 4 - (3''-fluorosulfonylphenyl)thiazole and 7 g. of quinoline are stirred in 200 cm.³ of anhydrous dioxane. To this solution are added within a period of 15 minutes 12.35 g. of palmitoylchloride and during the addition the temperature rises up to 40° C. The reaction mixture is stirred for another 2 hours at 50° C. and then poured into 2 N aqueous hydrochloric acid. After drying and washing with acetone, the fine-granular precipitate which formed is recrystallized from a mixture of benzene and Methyl Cellosolve. Yields: 23 g. of a white crystalline product with melting point between 183–184° C.

(f) *2[α - (3' - palmitoylaminobenzoyl)acetyl]amino-4- (3''-sulfophenyl)thiazole sodium salt.*—13.14 g. of sulfonylfluoride derivative are suspended in 75 cm.³ of acetone and the reaction mixture is stirred and boiled under reflux. Upon addition of 12 cm.³ of sodium hydroxide 5 N, the suspension is slowly converted into a clear solution. The reaction mixture is boiled for another 30 minutes. After acidifying with acetic acid and cooling to room temperature, the precipitate which formed is filtered off and recrystallized from methanol/water. Yields: 11 g. of white fine-granular crystals.

EXAMPLE 5

*Preparation of 2-[α-(3'-palmitoylaminobenzoyl)acetyl] amino-6-methylthiazole-5-sulfonic acid sodium salt*

(a) *2 - acetylamino - 4 - methyl - 5-fluorosulfonylthiazole.*—102 g. of 2-acetylamino-4-methyl-5-chlorosulfonyl-thiazole (Backer, De Jonge, Rec. Trav. Chem. 62 (1943) 163) are stirred in 500 cm.³ of dioxane at a temperature of 90° C. A solution of potassium fluoride in 50 cm.³ of water is added. The reaction mixture is stirred vigorously and heated under reflux for 1 hour. After cooling the reaction mixture is poured into water. The product is obtained as a white fine-granular precipitate. Recrystallization from diluted acetic acid yields 76 g. of white needles melting at 190–191° C.

(b) *2 - amino-4-methyl-5-fluorosulfonylthiazole.*—The acetylamino compound is boiled in an ethanolic hydrochloric acid solution for 3 hours and the cooled solution of the amino-hydrochloride so obtained is treated with a sodium bicarbonate solution. Starting from 59.5 g. of 2-acetylamino-4-methyl-5-fluorosulfonyl thiazole 37 g. of white crystals with melting point between 153–154° C. are obtained after recrystallization from diluted ethanol.

(c) *2[α-(3'-nitrobenzoyl)acetyl]amino-4-methyl-5-fluorosulfonyl thiazole.*—The same procedure was used as described in Example 1(a). The condensation of 19.6 g. of 2-amino-4-methyl-5-fluorosulfonyl thiazole with 22.3 g. of m-benzoylacetic acid methyl ester yields after recrystallization from a mixture of chlorobenzene and dioxane, 28 g. of pale-yellow fine crystals melting at 204° C.

(d) *2[α - (3' - aminobenzoyl)acetyl]-amino-4-methyl-5-fluorosulfonyl-thiazole.*—The reduction is carried out as described in Example 1(b). 38.7 g. of nitro derivative yielded after recrystallization from dichloroethane 30 g. of fine white needles with melting point between 196–197° C.

(e) *2[α - (3' - palmitoylaminobenzoyl)acetyl]amino-4-methyl-5-fluorosulfonyl-thiazole.*—7.14 g. of 2[α-(3'-aminobenzoyl)acetyl]amino-4 - methyl-5-fluorosulfonyl-thiazole and 2.13 g. of anhydrous sodium acetate are stirred in 80 cm.³ of anhydrous acetonitrile. The mixture is boiled under reflux and 5.49 g. of palmitoylchloride are added dropwise within 10 minutes. After complete addition, the mixture is refluxed for another hour. The hot reaction mixture is freed from precipitated sodium chloride and sodium acetate by filtration. The filtrate is cooled to room temperature. The precipitate which formed is filtered off and recrystallized from methanol. Yields: 9.5 g. of fine white crystals melting at 127° C.

(f) *2[α - (3'-palmitoylaminobenzoyl)acetyl]amino-4-methylthiazole-5-sulfonic acid sodium salt.*—5.95 g. of the above sulfonylfluoride derivative are refluxed with 50 cm.³ of acetone. 6 cm.³ of sodium hydroxide 5 N are added and refluxing is continued with stirring for another 1 hour. After acidification with acetic acid the mixture is cooled to room temperature and a white precipitate which is formed is recrystallized from methanol/water. Yields: 5 g. of a white product.

EXAMPLE 6

*Preparation of 3[α - (3' - α-hexadecylsuccinylamino-benzoyl)acetyl]aminobenzene sulfonic acid sodium salt*

(a) *3 - fluorosulfonyl[α-(3'-α-hexadecylsuccinylaminobenzoyl)acetanilide].*—16.8 g. of 3 - fluorosulfonyl-α-(3'-aminobenzoyl) acetanilide mentioned in Example 1(b) and 16.2 g. of α-hexadecylsuccinic anhydride (V. Barry, D. Twomey, Proc. Roy. Irish Acad. 51 (1947) 137) are refluxed for 4 hours with 150 cm.³ of anhydrous acetone. After cooling, the precipitate which is formed is filtered and recrystallized from ethanol. Yields: 25 g. of a white product melting at 180° C.

(b) *3[α-(3'-α-hexadecylsuccinylamino-benzoyl)acetyl] amino benzene sulfonic acid sodium salt.*—13.2 g. of the above sulfonylfluoride derivative are refluxed with 50 cm.³ of acetone. After adding 16 cm.³ of sodium hydroxide 5 N, refluxing is continued with stirring for 45 minutes. After acidification with acetic acid, the mixture is cooled to room temperature and the precipitate was filtered off and recrystallized from alcohol/water. Yields: 10 g. of white product.

EXAMPLE 7

*Preparation of 3[α - (-3'-α-hexadecylsuccinylamino-benzoyl)acetyl]amino-4-methylbenzene sulfonic acid sodium salt*

(a) *2 - methyl-5-fluorosulfonyl - α - (3'-α-hexadecylsuccinylaminobenzoyl) acetanilide.*—This compound was prepared by the procedure used for the preparation of Example 6(a). Starting from 17.5 g. of 2-methyl-5-fluorosulfonyl-α-(3'-aminobenzoyl)acetanilide (Example 3(a)) and 16.2 g. of α-hexadecylsuccinic anhydride there was obtained 22.5 g. of a product with melting point at 150° C.

(b) *3[α-(3'-α-hexadecylsuccinylamino-benzoyl)acetyl] amino-4-methylbenzene sulfonic acid sodium salt.*—The saponification of the above sulfonylfluoride derivative is carried out as given in Example 6(b). Starting from 13.48 g. of sulfonylfluoride derivative, there was obtained 10 g. of a white product.

EXAMPLE 8

*Preparation of 2-methoxy-5-[α-(3'-α-hexadecylsuccinylaminobenzoyl)acetyl]aminobenzene sulfonic acid sodium salt*

(a) *3 - fluorosulfonyl - 4-methoxy-α-(3'-nitrobenzoyl) acetanilide.*—In the same manner as mentioned in Example 1(a), 33.7 g. of a yellow crystalline product with melting point at 215° C. are obtained starting from 20.6 g. of 2-methoxy-5-aminobenzene sulfofluoride (mentioned in our U.S. patent application Serial No. 575,718, filed April 3, 1956 (now Patent No. 2,950,314) and 22.3 g. of m-benzoylacetic acid methyl ester.

(b) *3 - fluorosulfonyl-4-methoxy-α-(3'-aminobenzoyl) acetanilide.*—In a reduction carried out in the same manner as described in Example 1(b) 24 g. of a white crystalline product with melting point at 171° C. are obtained by starting from 39.6 g. of 3-fluorosulfonyl-4-methoxy-α-(3'-nitrobenzoyl)acetanilide and after recrystallization from ethanol.

(c) *3-fluorosulfonyl-4-methoxy-3[α-(3'-α-hexadecylsuccinylaminobenzoyl)acetanilide].*—This compound was prepared as mentioned in Example 6(a) Starting from 18.3 g. of 3-fluorosulfonyl-4-methoxy-α-(3'-aminobenzoyl) acetanilide and 16.2 g. of α-hexadecylsuccinic anhydride, there was obtained 24 g. of a white product which melted at 208° C.

(d) *2-methoxy-5[α-(3'-α-hexadecylsuccinylamino-benzoyl)acetyl]aminobenzene sulfonic acid sodium salt.*—The saponification of the above sulfonylfluoride derivative according to the procedure described in Example 6(b) yields starting from 13.8 g. of sulfonylfluoride compound and recrystallizing from ethanol/water, 9 g. of a white granular product.

EXAMPLE 9

*Preparation of 2[α-(3'-α-hexadecylsuccinylamino-benzoyl)acetyl]amino-4-(3''-fluorosulfonylphenyl)thiazole*

By the same method as was used in the preparation of the compound mentioned in Example 6(a), 29 g. of a white fine-granular product with melting point at 166° C. are obtained starting from 20.95 g. of 2[α-(3'-aminobenzoyl)acetyl]amino - 4 - (3'' - fluorosulfonylphenyl)thiazole (Example 4(d)) and 16.2 g. of α-hexadecylsuccinic anhydride and after recrystallization from acetonitrile.

EXAMPLE 10

*Preparation of 3[α-(3'-hexadecylsulfonylaminobenzoyl)acetyl]aminobenzene sulfonic acid sodium salt*

(a) *3-fluorosulfonyl - α - (3'-hexadecylsulfonylaminobenzoyl)acetanilide.*—18.6 g. of 3-fluorosulfonyl-α-(3'-aminobenzoyl)acetanilide are stirred in 80 cm.$^3$ of anhydrous pyridine. Whilst stirring, 16.23 g. of hexadecylsulfonylchloride (J. M. Sprague, T. B. Johnson, J.A.C.S. 59 (1937) 1838) are added to the resulting solution. The temperature rises slowly up to 35–40° C. and is kept for 30 minutes at this temperature. Then stirring is continued for 4 hours at 60–65° C. After cooling to room temperature, the red-brown reaction mixture is poured with stirring into 2 N aqueous hydrochloric acid and the precipitate which formed is dried for 2 hours at 40–50° C. After washing with n-hexane and drying at 70–80° C. a light-brown powder melting at 98–99° C. is obtained. Yield: 27 g.

(b) *3[α-(3' - hexadecylsulfonylaminobenzoyl)acetyl]aminobenzenesulfonic acid sodium salt.*—12.48 g. of this sulfofluoride derivative are refluxed with 80 cm.$^3$ of acetone. 12 cm.$^3$ of sodium hydroxide 5 N are added to the resulting solution and refluxing is continued for 30 minutes. After acidifying with acetic acid the mixture is cooled to room temperature whilst stirring. The precipitate which formed is filtered off and recrystallized from acetic acid. 8 g. of a white fine-granular product are obtained.

EXAMPLE 11

*Preparation of 3 α[3'-(4''-hexadecyloxybenzoyl)aminobenzoyl]acetyl aminobenzene sulfonic acid sodium salt*

(a) *3-fluorosulfonyl-α-[3'-(4'' - hexadecyloxybenzoyl)aminobenzoyl]acetanilide.*—16.8 g. of 3-fluorosulfonyl-α-(3'-aminobenzoyl)acetanilide (Example 1(b)) are refluxed with 200 cm.$^3$ of anhydrous acetonitrile. 19 g. of p-hexadecyloxybenzoylchloride (mentioned in our U.S. patent application 575,718, filed April 3, 1956, now Patent No. 2,950,314) are added to the refluxing solution within a period of 10 minutes. A precipitate is formed. On further refluxing this precipitate slowly dissolves and hydrochloric acid is split off. After 5 hours a clear solution is obtained again. On cooling to room temperature the product crystallizes and the precipitate is filtered off and recrystallized from acetone. Yields: 20 g. of a light-brown product with melting point at about 100–102° C.

(b) *3 α[3'-(4'' - hexadecyloxybenzoyl)aminobenzoyl]acetylaminobenzene sulfonic acid sodium salt.*—The saponification is carried out as described in Example 1(d). 13.6 g. of sulfonylfluoride derivative yield after recrystallization from acetic acid 10.5 g. of a white product.

EXAMPLE 12

*Preparation of 3-[α(3' - myristoylaminobenzoyl)acetyl] aminobenzene sulfonic acid sodium salt*

(a) *3-fluorosulfonyl - α - (3'-myristoylaminobenzoyl)acetanilide.*—16.8 g. of 3-fluorosulfonyl-α-(3'-aminobenzoyl)acetanilide (prepared as in Example 1(b)) and 4 g. of pyridine are dissolved in 80 cm.$^3$ of anhydrous dioxane. During a period of 10 minutes 12.35 of myristoyl chloride are added dropwise; whilst stirring, to the above solution, the temperature rising up to 35–40° C. Stirring is continued for 1 hour at this temperature for 2 hours at 70° C. After pouring the reaction mixture into 2 N aqueous hydrochloric acid, a fine-granular precipitate is obtained which is recrystallized from acetonitrile. Yields: 21 g. of a white product, melting at 94° C.

(b) *3[α-(3'-myristoylaminobenzoyl) - acetyl]-aminobenzene sulfonic acid sodium salt.*—10.92 g. of 3-fluorosulfonyl-α-(3'-myristoylamino-benzoyl) - acetanilide are refluxed with 80 cm.$^3$ of acetone; 12 cm.$^3$ of sodium hydroxide 5 N are added to the reaction mixture which is further refluxed for 45 minutes, whilst stirring. After acidifying with acetic acid and cooling to room temperature, the precipitate formed is filtered off and recrystallized from "Methyl Cellosolve" (registered trade mark for ethyleneglycol monomethyl ether). Yields: 10 g. of a white fine-granular product.

The above examples set forth are preferred embodiments of the instant invention. However, as will be apparent to one skilled in the art, numerous modifications can be made which fall within the scope of the instant invention. Thus, in the claimed sulfonated aroyl acetarylides, the arylide radical can be replaced by a heterocyclic radical such as pyridine, thiophene, thiazole and thiadiazole. The scope of the invention is to be construed in the light of the appended claims.

What is claimed:

1. Process for the preparation of a sulfonated aroyl acetarylide of the following formula:

$$X-NH-Ar-CO-CH_2-CO-NH-Y-SO_3Me$$

wherein, X is a radical of the group consisting of alkanoyl, alkyl sulfonyl, alkenoyl, and alkenyl sulfonyl of from 10–25 carbon atoms, at least 5 of these carbon atoms being arranged in a linear chain; Ar is phenylene, Y is a member selected from the group consisting of phenylene, alkyl substituted phenylene and alkoxy substituted phenylene, Me is a member selected from the group consisting of a hydrogen atom and an alkali metal atom; comprising the steps of (a) condensing an aroyl acetic ester of the following formula:

$$O_2N-Ar-CO-CH_2COOR''$$

wherein, R'' is a lower alkyl group with a compound of the formula $$H_2N-Y-SO_2F$$

(b) reducing with hydrogen in the presence of a nickel catalyst, (c) condensing the resulting compound with a member selected from the group consisting of an aliphatic acid chloride, an aliphatic carboxylic acid anhydride, and an aliphatic sulfonic acid chloride, said aliphatic portion being selected from the group consisting of alkyl and alkenyl of from 10–25 carbon atoms, at least 5 of these carbon atoms being arranged in a linear chain, and (d) hydrolyzing the resulting compound in the presence of an alkali metal hydroxide.

2. Process according to claim 1, wherein Y is phenylene.

3. Process according to claim 1, wherein X is palmitoyl ($=C_{15}H_{31}CO-$).

4. Process according to claim 1, wherein X is α-hexadecyl-succinyl $$\left(=C_{16}H_{33}-\underset{\underset{CH_2-COOH}{|}}{CH}-CO\right)$$

5. Process for the preparation of a sulfonated aroyl acetarylide of the following formula:

$$C_{15}H_{31}-CO-NH-C_6H_4-CO-CH_2-CO-NH-C_6H_4-SO_3Me$$

wherein Me is a member selected from the group consisting of a hydrogen atom and an alkali metal atom; comprising the steps of (a) condensing an aroyl acetic ester of the following formula:

$$O_2N-C_6H_4-CO-CH_2-COOR''$$

wherein R'' represents a lower alkyl group with a compound of the formula $H_2N-C_6H_4-SO_2F$ (b) reducing with hydrogen in the presence of a nickel catalyst, (c) condensing the resulting compound with palmitoyl chloride, and (d) hydrolyzing the resulting compound in the presence of an alkali metal hydroxide.

6. Process for the preparation of a sulfonated aroyl acetarylide of the following formula:

$$C_{16}H_{33}-\underset{\underset{CH_2-COOMe}{|}}{CH}-CO-NH-C_6H_4-CO-CH_2-CO-NH-C_6H_4-SO_3Me$$

wherein Me is a member selected from the group consisting of a hydrogen atom and an alkali metal atom; comprising the steps of (a) condensing an aroyl acetic ester of the following formula:

$$O_2N-C_6H_4-CO-CH_2-COOR''$$

wherein R'' represents a lower alkyl group with a compound of the formula $H_2N-C_6H_4-SO_2F$ (b) reducing with hydrogen in the presence of a nickel catalyst, (c) condensing the resulting compound with α-hexadecyl succinic anhydride, and (d) hydrolyzing the resulting compound in the presence of an alkali metal hydroxide.

7. Process for the preparation of a sulfonated aroyl acetarylide of the following formula:

$$C_{13}H_{27}-CO-NH-C_6H_4-CO-CH_2-CO-NH-C_6H_4-SO_3Me$$

wherein Me is a member selected from the group consisting of a hydrogen atom and an alkali metal atom; comprising the steps of (a) condensing an aroyl acetic ester of the following formula:

$$O_2N-C_6H_4-CO-CH_2-COOR''$$

wherein R'' represents a lower alkyl group with a compound of the formula $H_2N-C_6H_4-SO_2F$ (b) reducing with hydrogen in the presence of a nickel catalyst, (c) condensing the resulting compound with myristoyl halide, and (d) hydrolyzing the resulting compound in the presence of an alkali metal hydroxide.

8. Process for the preparation of a sulfonated aroyl acetarylide of the following formula:

$$C_{16}H_{33}-SO_2-NH-C_6H_4-CO-CH_2-CO-NH-C_6H_4-SO_3Me$$

wherein Me is a member selected from the group consisting of a hydrogen atom and an alkali metal atom; comprising the steps of (a) condensing an aroyl acetic ester of the following formula:

$$O_2N-C_6H_4-CO-CH_2-COOR''$$

wherein R'' represents a lower alkyl group with a compound of the formula $H_2N-C_6H_4-SO_2F$ (b) reducing with hydrogen in the presence of a nickel catalyst, (c) condensing the resulting compound with hexadecylsulfonyl chloride, and (d) hydrolyzing the resulting compound in the presence of an alkali metal hydroxide.

9. Process for the preparation of a sulfonated aroyl acetarylide of the following formula:

$$C_{16}H_{33}-O-C_6H_4-CO-NH-C_6H_4-CO-CH_2-CO-NH-C_6H_4-SO_3Me$$

wherein Me is a member selected from the group consisting of a hydrogen atom and an alkali metal atom; comprising the steps of (a) condensing an aroyl acetic ester of the following formula:

$$O_2N-C_6H_4-CO-CH_2-COOR''$$

wherein R'' represents a lower alkyl group with a compound of the formula $H_2N-C_6H_4-SO_2F$ (b) reducing with hydrogen in the presence of a nickel catalyst, (c) condensing the resulting compound with hexadecyloxybenzoyl chloride, and (d) hydrolyzing the resulting compound in the presence of an alkali metal hydroxide.

No references cited.

LORRAINE A. WEINBERGER, *Primary Examiner.*

M. WEBSTER, *Assistant Examiner.*